April 25, 1961 R. A. ANDERSON 2,981,107
AUTOMATIC RANGE CHANGE CIRCUIT
Filed Dec. 28, 1955 7 Sheets-Sheet 1

FIG. 1

INVENTOR:
RALPH A. ANDERSON
BY
Russell E. Hall
ATT'YS

April 25, 1961    R. A. ANDERSON    2,981,107
AUTOMATIC RANGE CHANGE CIRCUIT
Filed Dec. 28, 1955    7 Sheets-Sheet 2

FIG. 2

INVENTOR:
RALPH A. ANDERSON
BY
ATT'YS

FIG. 4

*INVENTOR:*
RALPH A. ANDERSON
BY

ATT'YS

April 25, 1961  R. A. ANDERSON  2,981,107
AUTOMATIC RANGE CHANGE CIRCUIT
Filed Dec. 28, 1955  7 Sheets-Sheet 5

FIG. 5

INVENTOR:
RALPH A. ANDERSON
BY
Russell E. Hatt
ATT'YS

FIG. 6

INVENTOR:
RALPH A. ANDERSON

April 25, 1961

R. A. ANDERSON 2,981,107

AUTOMATIC RANGE CHANGE CIRCUIT

Filed Dec. 28, 1955

INVENTOR:
RALPH A. ANDERSON
BY
Russell E. Hatten
ATT'YS

United States Patent Office 2,981,107
Patented Apr. 25, 1961

2,981,107

AUTOMATIC RANGE CHANGE CIRCUIT

Ralph A. Anderson, Chicago, Ill., assignor, by mesne assignments, to Information Systems, Inc., Skokie, Ill., a corporation of Illinois Filed Dec. 28, 1955, Ser. No. 555,872

16 Claims. (Cl. 73—341)

This invention relates primarily to automatic process logging systems, particularly to systems utilizing an automatic typewriter or other digital recorder to record the various conditions of a complicated industrial process. Some aspects of the invention, however, have a more general application.

In such systems, a primary measuring device is associated with each variable, the device constituting a transducer which provides, for example, a voltage output which is a measure of the value of the variable. In the case of temperature variables, the primary measuring device may be an iron-constantan thermocouple for temperature ranges of from 0° F. to 1300° F., or it may be a Chromel-Alumel thermocouple for temperatures in the range of from 1000° F. to 3000° F. Where pressure variables are involved, suitable transducers operating in various ranges are utilized which provide a voltage output proportional to the pressures involved. Where flow variables are involved, a suitable bellows-operated potentiometer may constitute the primary measuring device. For a given numerical value of the associated variable, each usually provides a different voltage output. The transducer outputs are sequentially fed to a self-balancing potentiometer circuit which controls a digital recorder which prints or types directly the actual numerical values of the variables.

Obviously, an important objective of such a system is to provide accurate information on the variables involved. A high degree of accuracy is difficult to obtain economically where a single measuring and recording unit, in the above example a potentiometer and digital recorder, is utilized to measure and record variables varying over a wide range of values. Also, in such case, the use of different types of transducers in a particular system having different scale factors presents a problem where the numerical recorded data is to indicate directly the values of the variables.

It is therefore an object of this invention to provide an automatic process logging system wherein a single measuring and recording unit is sequentially connected to different types of primary measuring devices or devices operating in widely different ranges and where a given high degree of accuracy is readily obtainable without the need of more expensive and precisely made apparatus than is required for a system designed for a more limited range of operation.

An auxiliary object of the invention is to provide an automatic process logging system as above described where a digital recorder is utilized to record data directly in numerical form representing the actual value of the variables.

A still further object of the invention is to provide an automatic process logging system for obtaining any one or more of the above objectives where a number of different types of non-linear thermocouples are utilized as primary measuring devices.

The type of measuring and recording system with which the present invention is primarily concerned utilizes a slide wire potentiometer balancing circuit wherein the voltage output of the primary measuring device is compared with the output of a motor driven slide wire potentiometer. A motor is operated to drive the wiper on the slide wire until the potentiometer output and the output of the primary measuring device are balanced. The motor which drives the slide wire is connected with an analogue to digital converter which produces data in digital form which corresponds to the position of the potentiometer wiper. The accuracy of the slide wire potentiometer may be represented as a given percentage of full scale deflection of its wiper. Obviously, the greater the number of numerical data units represented by full scale deflection the greater the inaccuracy of measurement. If, for example, full scale deflection of the potentiometer slide wire wiper represented the number 1000, a one-percent error would be reflected as a 10 unit error in measurement while it would be only 1 unit if full scale represented the number 100.

It is therefore another object of the present invention to provide a digital data recording system utilizing a balancing potentiometer slide wire circuit wherein full scale deflection of the slide wire wiper represents a much smaller number of measurement units than the overall range of variable values involved. In accordance with a preferred form of the invention, for each particular type of primary measuring device, such as iron-constantan thermocouple or Chromel-Alumel thermocouple, the data recording apparatus is arranged to operate within a different group of relatively narrow ranges. For example, for an iron-constantan thermocouple, the limit of movement of the slide wire wiper may represent 400 units for each of the overlapping ranges zero to 400° F., 300 to 700° F., 600 to 1000° F. and 900 to 1300° F. Automatic range changing means is provided so that when the slide wire reaches either of its two limits of operation, limit switches are tripped which automatically adjust the voltage input of the potentiometer so that it can balance signal voltages representing variables in the next higher or lower range. This may be effected by changing a resistance in series with and/or in shunt with the potentiometer. Actuation of the limit switches also vary the connections between the analogue to digital converter and the digital recorder so that the recorder automatically indicates in digit form the actual value of the variable connected to the recorder. The overlapping ranges prevent hunting which may occur in the case where the ranges do not overlap and where the value of the variable oscillates slightly between ranges. In such case, the limit switches would be continuously operated.

As is generally known in the art, thermocouples are inherently non-linear operating devices. That is, their temperature vs. voltage curve is non-linear. Since most measuring and recording devices are inherently linear devices, it becomes necessary to compensate for the non-linearity of the thermocouple voltage-temperature curve. It is another object of this invention to provide data recording apparatus which greatly simplifies the problem of linearizing the output of a thermocouple. In accordance with a preferred form of the invention, for each particular limited range of operation of the apparatus, during thermocouple scanning, a different set of compensating or linearizing resistors are connected to tap-off points on the slide wire potentiometer. By breaking up the operation of the recording apparatus into small discrete ranges, it is easier to compensate for thermocouple non-linearity than would be the case where the apparatus operates over the full range of temperature values. That is, it is difficult to linearize the thermocouple output over a wide temperature range.

Other objects, advantages and features of the invention will become apparent upon making reference to the specification to follow taken in conjunction with the drawings which disclose preferred embodiments of the invention.

Figure 1:
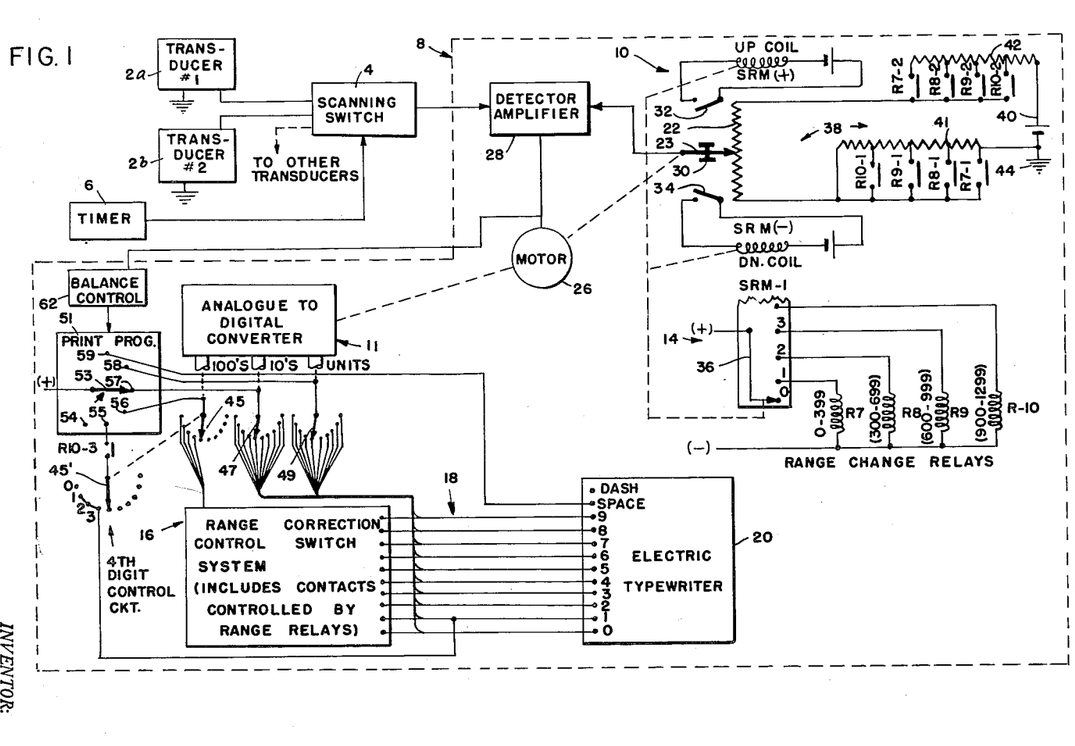
Fig. 1 is a simplified box diagram of an automatic data recording system incorporating features of the invention.

Refer now to the box diagram of Fig. 1 which is a simplified box diagram of one form of the invention. A number of primary measuring devices or transducers 2a, 2b, etc. are provided, each of which produces a voltage output which is a function of the value of an associated variable. For example, these devices may be thermocouples where temperature variables are involved, bellows-operated potentiometers where pressure variables are involved, or they may be flow integrating devices also utilizing potentiometers to provide voltages whose magnitudes are functions of the values of associated flow variables. The outputs of these transducers or primary measuring devices are connected to the input of a scanning switch 4 which may be a telephone-type stepping switch controlled by a source of timing pulses 6. The scanning switch 4 sequentially couples the output of the primary measuring devices 2a—2b, etc. to a digital recording system generally indicated by the reference numeral 8. The scanning switch maintains connection between a transducer and the recording system which after the recording of the data on the associated variable has been completed.

The recording system shown in the drawings includes a self-balancing potentiometer circuit 10, analogue to digital converter apparatus 11 which is operated by the self-balancing potentiometer circuit, a range change relay circuit 14 which has contacts in the self-balancing potentiometer circuit 10 and also in a circuit generally indicated by the reference numeral 16 which controls the connections between the analogue to digital converter 11 and the control channels 18 leading to a digital recorder 20, such as an electric typewriter.

The self-balancing potentiometer circuit 10 includes a linear slide wire potentiometer 22 having a wiper 23 whose position is controlled by a motor 26 which is in turn controlled by the output of a detector amplifier 28. The wiper 23 of the potentiometer is connected to the detector amplifier 28 to which also is connected the output of the scanning switch 4. When the potentiometer output voltage applied to the detector amplifier differs from the output of the transducers scanned at any instant, the motor 26 is energized to drive the wiper 23 to a position where the two inputs to the detector amplifier 28 are equal. If the transducers 2a, 2b, etc. are presumed to be liner devices, and if they are associated with variables varying over a given range, then to utilize full scale deflection of the potentiometer slide wire wiper for this range of values, the input voltage to the potentiometer in the circuit illustrated should be the voltage differential produced by the transducers over this range. We could define the sensitivity of the potentiometer in such case as the length of the slide wire divided by the number of units which full scale deflection thereof represents. The numerical data represented by the slide wire position in the present invention is recorded in digital form utilizing the analogue to digital converter 11 which, in a manner later to be explained, operates the electric typewriter 20 to type numerical data in digital form representing the actual value of the variables involved.

In accordance with the invention, full scale deflection of the slide wire wiper 23 represents only a limited range of variable values which is much less than the overall range of values to be recorded. If the expected margin of error is a certain percentage of full scale deflection of the potentiometer wiper, then this transposed to units of measurement would result in a much smaller error measured in units than would be the case where full scale deflection represents a much larger number of variable units. Means are provided for enabling the potentiometer slide wire 22 to be utilized over a number of limited ranges which together encompass the overall range of variable values required by a given system. For example, if the variable values range from 0 to 1300 units, then substantially full scale deflection of the potentiometer wiper would be utilized in say 400 unit ranges which overlap say 100 units. In such case, full scale deflection of the potentiometer slide wire wiper would represent, over the ranges of from 0 through 400, 300 through 700, 600 through 1000, and 900 through 1300. To this end, the potentiometer wiper carries a pair of actuating arms 30, one of which actuates an upper limit switch 32 when the wiper reaches a point near one end of the potentiometer, and the other arm of which actuates a lower limit switch 34 when the wiper reaches a point near the opposite or lower end of the potentiometer slide wire. Closing of the upper limit switch 32 energizes an up-coil SRM(+) and the closing of the bottom limit switch 34 energizes a down-coil SRM(—). The up and the down coils control the position of the wiper 36 of a step switch SRM-1 in the range relay circuit 14. The wiper is connected to a source of energizing voltage. When the up-coil is energized the step switch wiper is moved in one direction and when the down coil is energized the step switch wiper is operated in the opposite direction. The stationary contacts of the step switch SRM-1 are respectively connected to range change relays R7, R8, R9, etc., respectively. These relays have contacts in the circuit 38 associated with the potentiometer 22, and also in the range correction control switch circuit 16 leading to the typewriter input channels 18.

As a new range relay becomes energized by the stepping of switch SRM-1, the voltage applied to the potentiometer input is automatically varied to enable the potentiometer to operate in the new range. In addition, the connections to the typewriter input are changed so that the typewriter prints digital numerical datum of the actual value of the variables, irrespective of the range of operation of the potentiometer. The range change operations over a number of adjacent or overlapping ranges is effected automatically as the potentiometer wiper reaches the vicinity of its extreme limits of deflection.

The input circuit to the slide wire potentiometer 22, as illustrated in Fig. 1, includes a source of standard or predetermined voltage 40 each end of which is connected in series with tapped resistors 41 and 42, respectively, leading to opposite ends of the potentiometer slide wire 22. Connected in series with each of the tap-off points of each of these resistors 41 and 42 are contacts of a different one of the range change relays R7, R8, R9, and R10. (The contacts of these and other relays will be numbered similarly to the controlling relay with the addition of a number identifying the particular contacts thereof, such as contacts R7-1 and R7-2, R8-1 and R8-2, etc.)

The tap-off points on the resistors 41 and 42, and the locations or the order of the range control relay contacts are such that the proper voltage is applied across the potentiometer slide wire to balance the range of signal voltages obtained in the range of operation involved. Assume, for example, that the transducers 2a, 2b, etc. are linear devices and that at a particular instant transducer 2a is connected by the scanning switch 4 to the input to the detector amplifier 28. Assume, further, that the wiper 36 of the step switch SRM-1 contacts stationary contact No. 2 so that range relay R8, which is to operate in the range of from 300 to 699 units, is energized. If the voltage output of the transducer 2a is a voltage corresponding to a variable value of 200 units, then the potentiometer circuit will be unbalanced and the motor 26 will drive the potentiometer wiper toward the bottom end of the slide wire. When the wiper reaches a position near the lower end thereof, the lower limit switch 34 would be operated thereby energizing the down coil SRM(−). This will step the switch SRM-1 one point downward so that range relay R7 connected to the No. 1 contact of the step switch will become energized. This will close the contacts R7-1 and R7-2 leading to the tapped resistors 41 and 42, respectively, points which will apply the proper voltage to the ends of the potentiometer slide wire to balance signal voltages representing units from 0 through 399. If the value of the variable scanned exceeded the range of from 300 to 699, then the motor 26 would drive the potentiometer wiper toward the upper end of the slide wire where the upper limit switch 32 will be tripped to pulse the up-coil SRM(+). This will step the wiper arm 36 from the No. 2 position to the No. 3 position energizing relay R9 which operates the system in the range of from 600 to 999. The contacts R9-1 and R9-2 associated with the tapped resistors 40 and 41 will close to apply the proper voltage to the potentiometer slide wire to balance signals representing variables in this range.

Where the transducers 2a, 2b, etc. are linear, the sum of the resistance inserted in series between the voltage source 40 and the potentiometer input would remain constant over the various range switching operations, but the division of the resistance between the upper terminal of the potentiometer and the voltage source on the one hand and the lower terminal of the potentiometer and the voltage source on the other hand would vary in equal but opposite amounts. Thus, when the range change relay contacts shunt out a given number of resistance units from one of the resistors 41 or 42, the same number of resistance units are inserted into the circuit by removing a shunt across part of the other resistor. The output voltage of the potentiometer is measured between the slide wire wiper 23 and ground at point 44 connected to one terminal of the voltage source 40. This is the voltage which is fed to the detector amplifier and is compared with the output of the transducers. The voltage variation at the potentiometer output is thus made variable over the same range of voltage values as the variation in the output of the transducers over the limited range of values involved. Where the output of a transducer is non-linear, as in the case with many thermocouples, certain additions are made to the potentiometer circuit which will maintain a linear relationship between the position of the slide wire wiper and the actual value of the variable being measured. This will be discussed later on in the specification. Also, if the scale factor of the transducers vary, that is, if the variation in their voltage output per unit change of the associated variable differs between transducers, then the input circuit to the potentiometer slide wire must be varied as a different type of transducer is switched into the system. This will also be discussed later on in connection with another embodiment of the invention.

The description will now explain how the position of the slide wire wiper controls the operation of the typewriter so that digital data is typed on a record sheet which data represents the actual value of the variables for any operating range of the potentiometer.

As previously mentioned, the motor 26 will drive the wiper of the potentiometer until a balanced condition is obtained. The motor shaft is coupled to the analogue to digital converter 11 which produces three outputs indicative of the value of each of the digits making up a number represented by the position of the slide wire wiper. Although the analogue to digital converter may be one of a number of different types of well known analogue to digital converters, the one illustrated in the drawing is a mechanical type which converts the movement of the motor shaft to three separate shaft rotations representing the analogue position of the slide wire wiper. It should be noted that the position of the three shaft output of the analogue to digital converter is merely a function of the position of the slide wire wiper and is not related to the particular range of operation of the equipment.

The output shafts of the digital converter 11 control the position of the wipers of three ten-position switches represented by the reference numerals 45, 47 and 49 representing, respectively, hundreds, tens and units shaft outputs of the converter. The wipers of these switches are sequentially fed with an operating voltage through a programmer step switch 51. In the simplified diagram of Fig. 1, this programmer includes a wiper 53 connected to a source of energizing voltage and stationary contacts 54, 55, 56, 57, 58 and 59. Contact 54 represents an idle contact and is unconnected as shown, the next stationary contact 55 is connected to a circuit which will be described, and the next succeeding contacts 56, 57 and 58 are respectively connected to the wipers of the digit switches 45, 47 and 49.

The circuit associated with the stationary contact 55 includes a set of normally open contacts R10-3 of range relay R10 which is in series with a ten position switch 45′ which is ganged for movement with the hundreds ten-position switch 45. The No. 1, No. 2 and No. 3 contacts of the switch 45′ are connected together and the three in turn are connected to the No. 1 channel of the input 18 to the electric typewriter 20. (The numbers of the channels correspond to the number which will be typed when the channel in question is energized. That is, when the wiper of the switch 45′ is in engagement with contacts 1, 2 or 3, the electric typewriter 20 will be operated to print the No. 1.) The circuit just described is utilized in providing a fourth digit in a manner to be more fully explained hereinafter.

Figure 2:
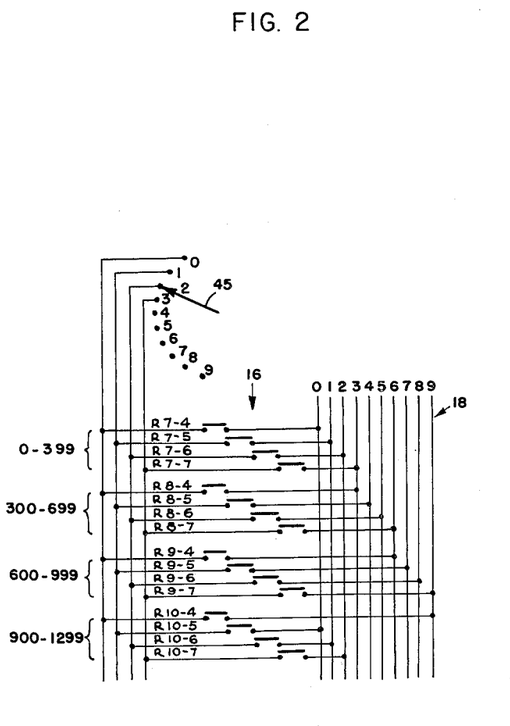
Fig. 2 is a circuit diagram of part of the range correction control switch system shown in block form in Fig. 1.

The stationary contacts of the hundreds switch 45 are connected to a range correction control switch system shown in detail in Fig. 2 so that the electric typewriter is responsive both to the position of the wiper of the hundreds switch as well as to the particular range of operation involved. To explain this more fully, if it is assumed that full scale deflection of the potentiometer wiper represents 399 units, then the wiper of the hundreds switch 45 will contact the zero contact of this switch when the potentiometer wiper arm is positioned along the lower quarter of the potentiometer slide wire, and will contact its No. 1, No. 2 and No. 3 contacts, respectively, when the slide wire wiper is positioned, respectively, in the second, third and fourth quarters of the potentiometer slide wire. This is true irrespective of the range of operation of the equipment, as explained above. In the range of from zero to 399, the No. 0, No. 1, No. 2 and No. 3 contacts of the hundreds switch 45 will be connected respectively to the similarly numbered channels of the typewriter input through normally open range relay contacts R7-4, R7-5, R7-6, and R7-7 (Fig. 2) to produce respectively the numbers 0, 1, 2 and 3, respectively, when the wiper touches these contacts. Where the range of operation of the equipment is from 300 to 699, it is apparent that a variation in variable value over this range will result in the movement of the potentiometer slide wire from its bottom through its top position. In order to print a fast or hundreds digit ranging from 3 through 6 for this range of operation of the potentiometer slide wire, the No. 0 to No. 3 contacts of the hundreds switch 45 are connected respectively and in order to the No. 3 through the No. 6 channels of the typewriter input through normally open contacts R8–4, R8–5, R8–6, and R8–7 of range relay R8. Likewise, in the range of operation of from 600 to 999, the No. 0 through No. 3 contacts of the hundreds switch 45 are connected respectively with the No. 6 through No. 9 channels of the electric typewriter through normally open contacts R9–4, R9–5, R9–6, and R9–7 of range relay R9. In the range of from 900 through 1299, the hundreds digit varies successively through the Nos. 9, 0, 1 and 2. Accordingly, the Nos. 0 through No. 3 contacts of the hundreds switch 45 are connected to the No. 9, and the No. 0, the No. 1, the No. 2 channels of the typewriter input, respectively, through contacts R10–4, R10–5, R10–6, and R10–7 of range relay R10. In the latter range of operation, it should be noted that a fourth digit "1" is required for numerical values of from 1000 to 1299. This fourth digit is required when the hundreds digit is either 0, 1 or 2 and relay R10 is energized. Accordingly, the circuit will produce the No. 1 digit when the wiper 53 of the programmer 51 is connected to the stationary contact 55, since a circuit can be traced from the wiper 53 of the programmer through the then closed set of contacts R10–3, through either the No. 1, the No. 2 or the No. 3 stationary contact of the switch 45', which, as explained above, is ganged for movement with the hundreds switch 45, and then to the No. 1 channel of the typewriter input.

Since the position of the wipers of the tens and units switches 47 and 49 correspond to the tens and units digits of the number represented by the slide wire wiper for all ranges, the stationary contacts thereof are connected to the similarly numbered channels of the typewriter input 18. The wiper 53 of the programmer 51 is operated to successively contact the contacts 55 through 58, which are respectively associated with circuits which produce the thousands, hundreds, tens and units digits of the data to be recorded, immediately after the potentiometer circuit has been balanced. Accordingly, utilizing well known techniques, a balance control means 62 is provided for controlling the programmer switch 51. The balance control member may comprise a relay which is controlled by the output of the detector amplifier 28. That is, when the potentiometer slide wire is in a balanced position, the output of the detector amplifier 28 will be zero and the existence of a zero output in the detector amplifier may be utilized to operate a relay which in turn controls or initiates the movement of the programmer switch 51. The programmer switch 51 may comprise a telephone-type stepping switch and other suitable circuitry for stepping its wipers successively from the idle contact 54 through the other contacts, making contact with each of its contacts for sufficient time to enable a data printing operation to be completed. Since the details of such circuitry are well known in the control field, a detailed disclosure thereof will not be given in this specification. Following the printing of the data on the variable, the programmer wiper 53 is moved to a contact 59 leading to a spacing channel of the typewriter 20 to index the carriage of the typewriter to provide a blank space. Other positions on the step switch may be provided for units information. Following recording of the data on a variable, the programmer wiper is automatically returned to its home contact 54.

Figure 3:
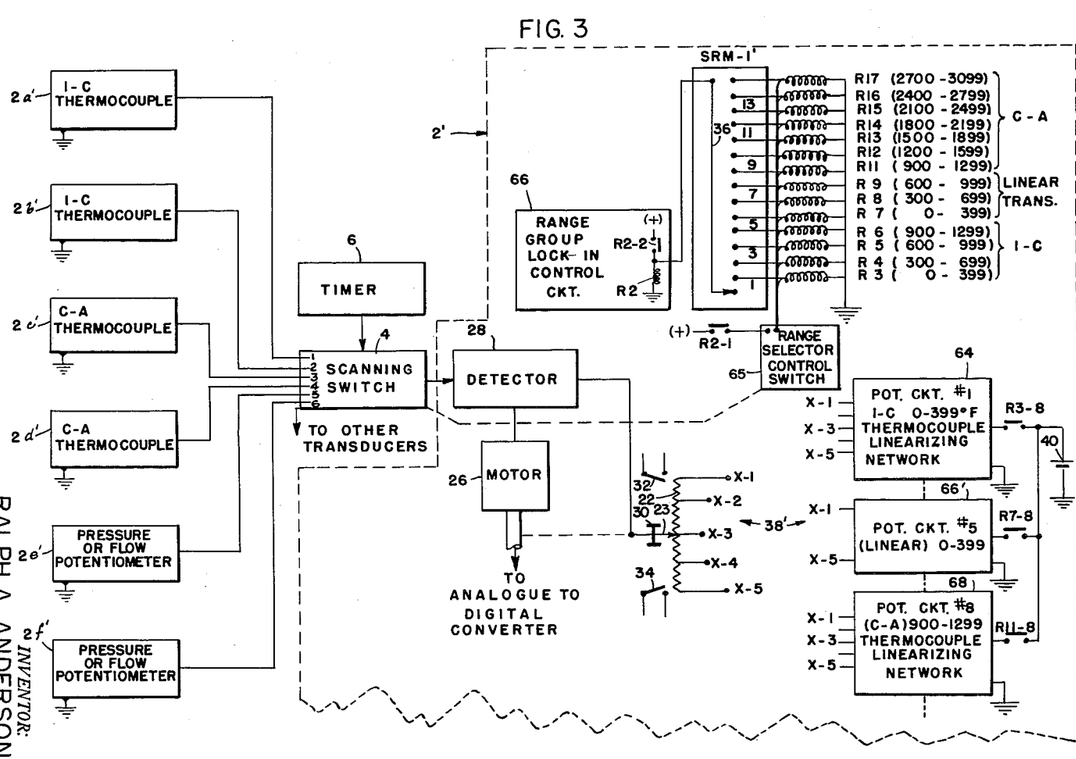
Fig. 3 is a box diagram of part of a recording system similar to that shown in Fig. 1 but which has been modified to accommodate the use of different types of primary measuring devices.

In the system of Fig. 1 just described, it was assumed that the transducers each had similar scale factors so that the input circuit of the potentiometer varied only with the particular range of operation desired rather than with the type of transducer or the scale factor of the transducer involved. When the transducers required have different scale factors, the input circuit of the potentiometer must also be varied in accordance with the particular transducer being scanned. Fig. 3 shows in box form part of a recording system which includes features which enable it to be used with transducers having different scale factors. Transducers 2–a' and 2–b' are shown to be iron-constantan thermocouples which find use with temperatures in the range of from zero through 1300 degrees F. They are inherently non-linear operating devices. The transducers 2–c' and 2–d' are Chromel-Alumel thermocouples which are used with temperatures in the range of from 1000 to 3000 degrees F. Transducers 2–e' and 2–f' are shown as pressure or flow potentiometer transducers. It will be assumed for sake of discussion that these flow or pressure transducers have the same scale factor.

These and numerous other transducers are coupled to the input of the scanning switch 4 which sequentially couples the output of the transducers to the input of the detector amplifier 28. The modified recording system 2' utilizes the same slide wire potentiometer apparatus previously described, but has a modified potentiometer input circuit 38' which is responsive both to a change in range and to a change in the transducer scanned. In the example to be described, it is assumed again that full scale deflection of the potentiometer slide wire wiper represents 399 units.

For each type of transducer, a different group of range control relays are provided which operate within limited 399 unit ranges overlapping by 100 units. The range control relays R3 through R6 are associated with the iron-constatan thermocouples 2–a' and 2–b' and others not shown which operate with variables varying in the range of from zero through 1299 degrees F. since four such overlapping ranges are required to cover this overall range. The range control relays R7 through R9, also shown in Fig. 1, are utilized in association with the linear pressure potentiometers 2–e' and 2–f' which it is assumed operate within the range of from 0 to 999. Thus, three such limited overlapping ranges are required to cover this range. If the scale factors of the transducers are different, a different group of range control relays could be used for each of the transducers 2–e' and 2–f'.

A third group of relays R11 through R17 are operated when the Chromel-Alumel thermocouples are connected into the recording circuit for measurement of temperatures within the range of from 900 through 3099 degrees F. This requires 7 ranges of 399 units overlapping by 100 units. Altogther, there are fourteen different input circuits provided to the potentiometer slide wire, one circuit associated with each of the range control relays. The boxes 64—66'—68 in Fig. 3 represent three such input circuits to the potentiometer, and contacts of the range relays, such as R3–5, R7–5 and R11–5 control the insertion and removal of these circuits between the voltage source 40 and the potentiometer slide wire.

The potentiometer input circuit associated with the thermocouples, which are non-linear devices, include resistors (not shown in Fig. 3) which are connected across tap-off points on the slide wire 22 through contacts of the range relays. Although the curve of output voltage versus variable value of these thermocouples is non-linear over temperature ranges exceeding appreciably 100 degrees, it has been found that the output of these thermocouples for ranges in the neighborhood of 100 degrees do not vary appreciably from the linear condition. Linearizing resistors are connected between successive tap-off points on the slide wire which represent 100 unit changes in temperature. A different set of four resistors such as 3—1 to 3—4, ... or 17—1 to 17—4 (Fig. 6) are connected between tap-off points X–1, X–2, X–3, X–4 and X–5 through contacts such as R3–6 to R3–9, ... or R17–6 to R17–9 for each range and for each type of thermocouple. Substantially perfect correction for the non-linearity of each thermocouple output is provided at these points, and the deviation from linearity between these points is quite small.

The respective groups of range control relays above mentioned are connected to successive stationary contacts of the step switch SRM–1' which operates similar to the step switch SRM–1 described in the embodiment of Fig. 1. The relays are arranged, of course, in the order of increasing ranges for each group of relays.

In the interest of increasing the speed of operation of the system, a range selector control switch means 65 is provided which operates in synchronism with the scanning switch 4. The range selector control switch may be a telephone-type stepping switch system having at least one stationary contact for each test point or variable involved in the system. The wiper of this switch couples energizing voltage through its stationary contact associated with the transducer being scanned to the particular range relay within the group of relays associated with the variable scanned which relay includes the normal expected value or limited range of values of the associated variable. Thus, for example, if the thermocouple 2–a' was scanned and this thermocouple was associated with a variable which is normally in the neighborhood of 1000 degrees F., the range selector control switch 65 would couple a source of energizing potential through a set of normally closed contacts R2–1 to range control relay R6 which operates the equipment in the range of from 900 through 1299 degrees F. A range group lock-in control circuit 66 is provided which initiates the stepping of the step switch SRM–1'. The stepping continues until the wiper 36 of the step switch contacts a terminal which is associated with the energized range control relay. When this occurs, a relay R2 in series with the wiper 36 becomes energized. This opens the normally closed contacts R2–1 in series with the wiper of the range selector control switch 65 thereby disconnecting control over the energization of the range control relays from the range selector control switch. If the temperature variable involved falls within the range in which the equipment is operating, then the potentiometer slide wire 22 is quickly balanced and a recording of the value of the variable is effected in a manner similar to that explained in connection with the embodiment of Fig. 1. On the other hand, if the temperature variable is so abnormally low that it falls within the next lower range, then the motor 26 will move the potentiometer wiper into its lowermost position where the lower limit switch 34 is actuated. As is apparent from the previous explanation of the embodiment of Fig. 1, this results in the movement of the wiper 36 of the step switch SRM–1' to the next lower contact, which is contact No. 3, which results in the energization of range relay R5. This connects the appropriate potentiometer input circuit to the potentiometer slide wire to permit a balancing thereof and a consequent recording of the value of the variables.

The range group lock-in control circuit 66 above mentioned, in addition to the function of effecting the movement of the wiper 36 to the appropriate stationary contact, also prevents the wiper from being moved into engagement with a contact associated with another group of range control relays. The operation of this circuit will be explained in more detail later on in this specification.

Figure 4:
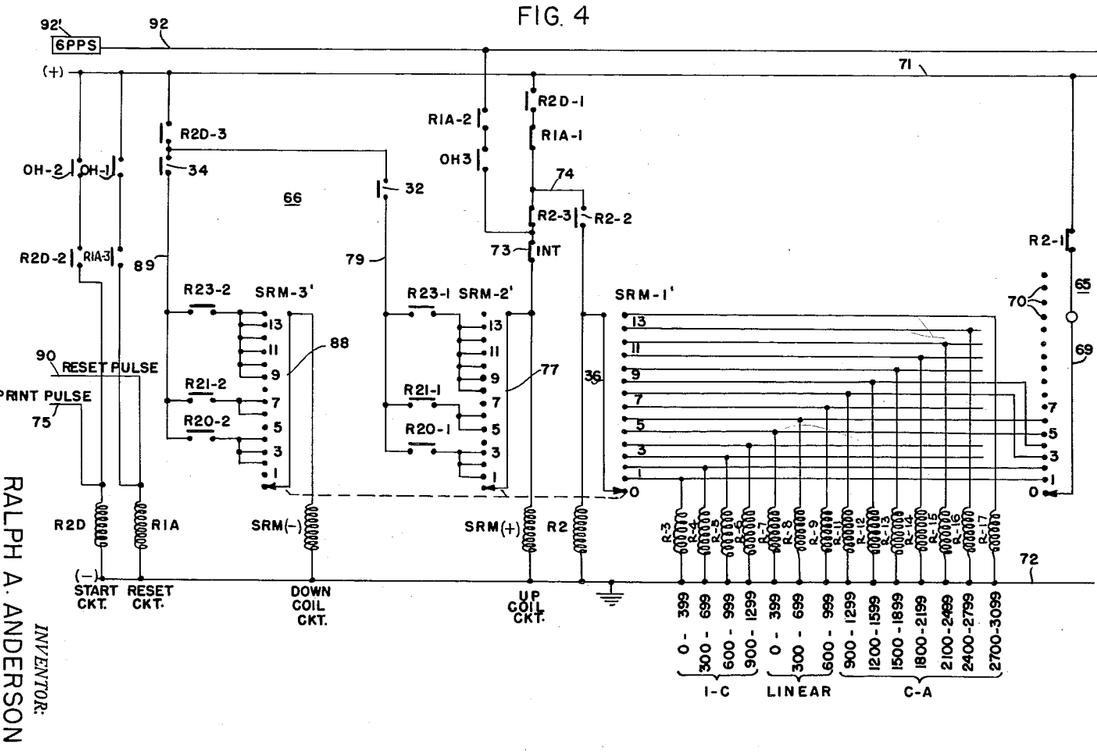
Fig. 4 is a circuit diagram of part of the circuit represented in Fig. 3.
Figure 5:
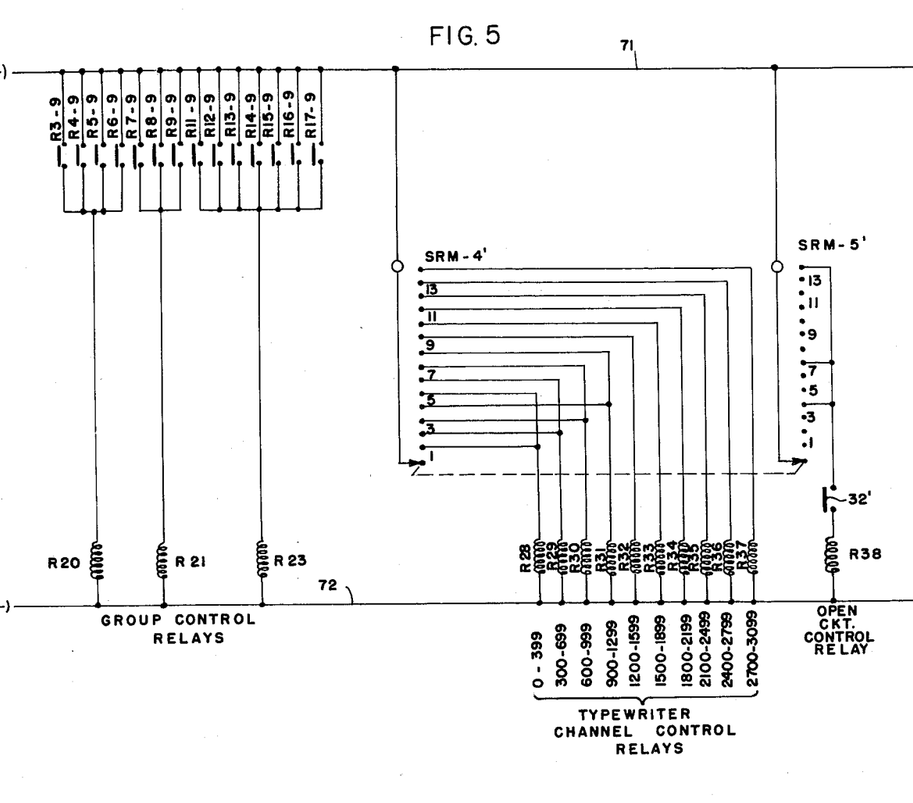
Fig. 5 is a circuit diagram which is a continuation of the diagram shown in Fig. 4.

Refer now to Figs. 4 and 5 which show the detailed circuit diagram of a preferred circuit for controlling the operation of the range control relays. This circuit includes details of the range selector control switch 65 and the range group lock-in control circuit 66.

The range selector control switch 65 is shown in Fig. 4 as a telephone-type stepping switch having a wiper 69 and stationary contacts 70. The scanning switch 4 shown in block form in Fig. 3 may be a similar type of switch and, as above stated, the scanning switch and the range selector switch are operated in synchronism and have corresponding contacts associated with the respective variables to be monitored and recorded.

The wiper 69 is connected to a power line 71 through normally closed contacts R2–1 of the range selection lock-in relay R2 previously mentioned. The stationary contacts 70 of the range selector control switch 65 are connected to respective terminals of the range relays which in turn are connected to the other power line 72. Each range relay operates the recording apparatus in the range which includes the normal or usual value or values of the variable associated with the particular range selector control switch contact involved. Thus, the No. 1 through No. 6 stationary contacts of the range selector control switch are shown respectively connected to terminals of range relays R3, R4, R11, R12, R7 and R8, since it is assumed that variables or test points No. 1 through No. 6 normally operate respectively in the range of operation controlled by the aforementioned relays. In the drawings it is assumed that contacts No. 1 through No. 6 of the range selector relays and, for that matter, of the scanning switch 4 are respectively connected to transducers 2a' to f' shown in Fig. 3. Since different groups of range relays are provided for the different types of transducers involved, the stationary contacts of the range selector control switch must be connected to the range relay in the appropriate group identified with the type of transducer involved.

As in the embodiment of Fig. 1, the range control relay step switch SRM–1' besides the wiper 36 and stationary contacts includes an up-coil SRM (+) which when pulsed moves the wiper 36 in one direction, toward the higher numbered contact in the drawing, and a down-coil SRM (−) which when pulsed moves the wiper 36 one contact in the opposite direction, toward the lower numbered contacts. The wiper 36 when the equipment is in its quiescent condition rests on the home or zero contact which is unconnected with any of the range relays.

One of the circuits which pulses the up-coil can be traced from the power line 72 through the up-coil, and then through interrupter contacts 73 of the step switch SRM–1', normally closed contacts R2–3 of the range selector lock-in relay, normally closed reset relay contacts R1A–1 and normally open print command relay contacts R2D–1 leading to the other power line 71. A line 74 extending from a point between the contacts range selector lock-in relay contacts R2–3 and reset contacts R1A–1 leads to the normally open set of range selector lock-in relay holding contacts R2–2 which lead to the junction of the wiper 36 of the step switch SRM–1' and one of the terminals of the range selector lock-in relay R2. The opposite terminal of the range selector lock-in relay is connected to the power line 72.

Before explaining the operation of the circuit just described, the circuit for operating the print command relay R2D shown at the left hand of Fig. 4 should be explained. The print command relay has one terminal connected to the power line 72 and the other terminal connected to a print pulse line 75 and to the other power line 71 through a circuit path which includes normally opened holding contacts R2D–2 in series with the contacts OH–2 of the step switch SRM–1'. The opening and closing of the contacts OH–2 are controlled by the position of the wiper 36 of the step switch SRM–1'. The contacts OH–2 are closed for all positions of the step switch wiper except the position where the wiper engages the home or zero stationary contact. The print pulse line 75 is pulsed automatically by a pulse fed from the timing source 6 when it is desired to initiate the measuring and recording of a newly scanned variable. The pulse in the line 75 will energize the print command relay R2D. This will establish a holding circuit which includes the then closed contacts R2D–2 and the then newly closed contacts OH–2, the latter being closed because the energization of the relay R2D by the print pulse will result in the stepping of the wiper 36 to the No. 1 stationary contact.

Upon the energization of the relay R2D, the up-coil will be pulsed through a circuit including the normally closed interrupter contacts 73, the normally closed contacts R2–3, the normally closed contacts R1A–1 and the then closed print command contacts R2D–1. Opening and closing of the interrupter contacts 73 will continue until the wiper 36 of the step switch SRM–1' engages the stationary contact which is connected to the range relay energized through the range selector control switch 65. When this occurs, energizing potential is connected to the range selector lock-in relay R2 through the wiper 36 and a holding circuit is established for relay R2 upon the closing of the holding contacts R2–2. This will terminate, for a moment at least, the pulsing of the up-coil upon the opening of the normally closed contacts R2–3 in series with the interrupter contact 73. Control over the energization of the range control relays is then disconnected from the range selector control switch 65 upon the opening of the normally closed contacts R2–1, and is transferred to the step switch SRM–1'. Further pulsing of the up-coil is then controlled by a circuit associated with a second level SRM–2' of the range control relay step switch. The level SRM–2' has the same number of stationary contacts as the switch level SRM–1'.

In explaining the operation of this and other levels of the step switch, it should be kept in mind that the No. 1 through No. 4 contacts thereof are utilized to operate the recording equipment in the range of from zero through 1299 when an iron-constatan thermocouple is connected into the system, the No. 5 through the No. 7 contacts are utilized over the range of operation of from zero through 999 when a linear transducer, such as 2e' and 2f' are connected into the system, and the No. 8 through No. 14 contacts are utilized for the range of operation of from 990 through 3099 when a Chromel-Alumel thermocouple is connected into the system. In the case of the level SRM–2', the No. 1 through the No. 3 contacts are jumpered together with the fourth contact representing operation in the highest limited range of the group of ranges involved left unconnected, for reasons to be explained. For similar reasons to be explained, the No. 5 and No. 6 contacts are jumpered together, and the No. 7 contact is left unconnected; also, the No. 8 through No. 13 contacts are jumpered together and the No. 14 contact is left unconnected. The wiper 77 of the level SRM–2' is connected to the upper terminal of the up-coil SRM(+). The above-mentioned groups of jumpered terminals or contacts are respectively connected to normally open contacts R20–1, R21–1 and R23–1 of master group relays R20, R21 and R23 shown in Fig. 5. The master group relays are respectively energized through circuits extending from one of the power lines 72 through respective groups of range relay contacts connected in parallel, each group of contacts being associated with the range relays in the various groups above mentioned, that is, the groups representing operation with iron-constatan thermocouples, linear transducers such as 2e' and 2f', and the Chromel-Alumel thermocouples. Thus, the master group relays R20, R21 and R23 associated with the energized range control relay at any particular instant will be energized. The master group relay contacts R20–1, R21–1 and R23–1 are joined by a common line 79 which leads to the upper limit contacts 32, which are closed when the wiper of the slide wire potentiometer reaches the vicinity of its upper limit of movement, and the limit contacts 32 lead to the power line 71 through normally open print command contacts R2D–3.

The upper limit switch 32 in one embodiment was positioned to close when the wiper reached the upper 2% of extent of the slide wire. Closing of this limit switch results in the energization of the up-coil when the wiper 77 is connected to one of the jumpered stationary contacts and the print command contacts R2D–3 and the associated master group control relay contacts R20–1, R21–1 or R23–1 are closed.

The purpose of the level SRM–2' which may now be appreciated, is to lock or limit the movement of the wiper 77 of the level SRM–2' to only those stationary contacts which are associated with the range relays identified with the transducer being scanned at any instant. Assuming that the range relay step switch wipers are initially directed to the No. 1 stationary contacts, and value of the variable being measured is abnormally high as to fall beyond the upper range of values 900 through 1299, the upper limit contacts will be actuated continuously and the wiper 77 will be moved to the No. 4 stationary contact which is unconnected. The up-coil cannot receive any further pulses from the circuit associated with the level SRM–2' so that the step switch wipers cannot be moved into engagement with the contact associated with the next groups of range control relays, which would obviously interfere with the proper operation of the equipment.

When the wiper 77 of the level SRM–2' is on one of the unconnected contacts 4, 7 or 14, and the value of the variable being measured exceeds such upper limited range or an open circuit in the transducer circuit exists, an open circuit control relay R38 shown in Fig. 5 is energized. When the latter relay is energized, the contacts thereof, to be described, energize the channel of the typewriter input which will produce dashes when the print programmer 51 (see Fig. 7) is in a position for printing the thousands, hundreds, tens or units digits, thereby indicating to an operator that the value of the variable exceeds the maximum range of operation of the equipment at a particular time or that an open-circuit existed.

Figure 7:
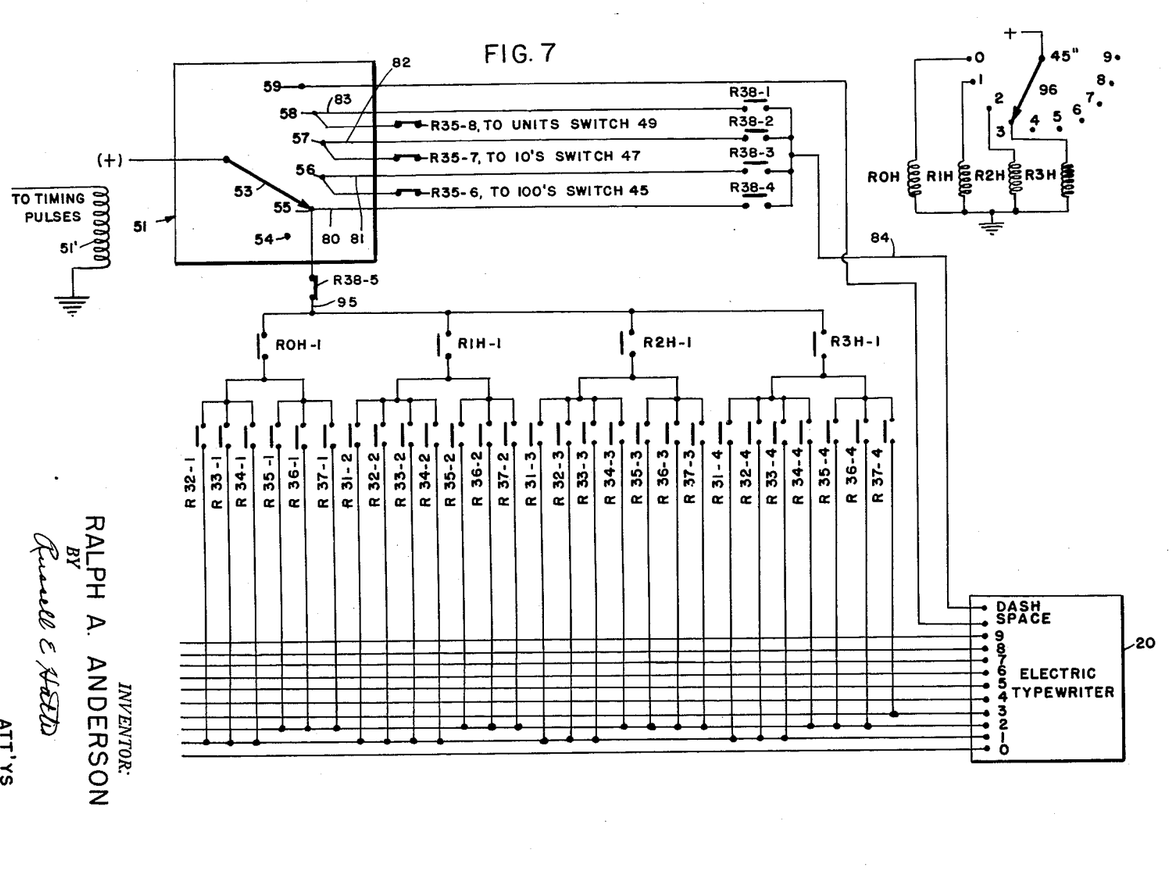
Fig. 7 is a circuit diagram of part of he typewriter control circuit used with the embodiment of Fig. 2 which controls the typing of the fourth digit.

The energizing circuit associated with the open circuit control relay may be traced from power line 72, through the open circuit control relay R38, through auxiliary upper limit contacts 32' which operate with the upper limit contacts 32, and through the No. 4, No. 8 or the No. 14 stationary contacts of another level SRM–5' of the range control relay step switch SRM. Referring more particularly to Fig. 7, branch lines 80 through 83 extend respectively from the thousands, hundreds, tens and units contacts 55 through 58 of the programmer 51 to normally open contacts R38–1 through R38–4 of the open circuit control relay R38. A common line 84 connects all of the contacts R38–1 through R38–4 to a dash channel of the typewriter input. Normally closed contacts R38–5 through R38–8 are inserted in the lines leading to the circuits for producing the fourth digit, and to the hundreds, tens and units switches. Energization of relay R38 will therefore result in the closing of contacts R38–1 through R38–4 to produce dashes when the programmer wiper engages its contacts 80—83. The programmer 51 may be a step switch having a stepping coil 51' which is fed with pulses from timer 6 (Fig. 3) at the appropriate time. The pulses are timed so that time is allowed for possible balancing of the potentiometer slide wire circuit before the wiper is moved from the home contact 54.

The circuit for pulsing the down-coil SRM(–) will now be described. The down-coil is connected to the wiper of a level SRM–3' of the range control relay step switch SRM. This level of the step switch is arranged to prevent the wiper 88 from being moved from a stationary contact associated with the lowest limited range in the various groups, namely stationary contacts Nos. 1, 5 and 8, to the contact below, to maintain the apparatus within the proper range groups. Thus, the No. 2 through No. 4 stationary contacts, the No. 6 and No. 7 stationary contacts, and the No. 9 through the No. 14 stationary contacts of the level SRM–3' are respectively jumpered together and connected to a common line 89 through the associated master group relay contacts R20–2, R21–2 and R23–2. A line 89 connects with the lower limit switch contacts 34 which are closed when the wiper of the potentiometer slide wire is in the vicinity of its lower limit, such as the lower 2% of the slide wire. The lower limit contacts 34 connect with the power line 71 through the normally open print command contacts R2D–3. Accordingly, whenever the lower limit contacts 34 are closed, and the print command relay R2D is energized, the down-coil will be energized so as to step the wipers of the step switch SRM to the next lowest contact position, except that when the wiper is on any of the unconnected contacts No. 1, No. 5 or No. 8, the down-coil will not be energized when the lower limit contacts are closed. The position of the wiper of the step switch is thus maintained within a group of contacts identified with one of the range groups.

Following the completion of a recording operation, and prior to the beginning of the next measuring and recording operation, the timer 6 or some other pulse source feeds a pulse to the reset pulse line 90 (see Fig. 4) leading to the reset relay R1A. This energizes the reset relay which locks in through a circuit including the holding contacts R1A–3 and the off-home contacts OH–1 of the range control step switch SRM, which are closed except where the wipers of the step switch are in their home or zero position. When the reset relay is energized, the up-coil SRM(+) is pulsed via a branch circuit extending from a pulse line 92 connected to a pulse source 92' generating, for example, six pulses per second, through the then closed normally closed contacts R1A–2 and the then closed homing contacts OH–3 leading to the upper terminal of the up-coil. The pulsing of the up-coil through this circuit terminates when the wipers are homed which results in the opening of the contacts OH–3. When the step switch wipers are homed, the print command relay R2D is de-energized upon the opening of the homing contacts OH–2 of the step switch, reset relay R1-A is de-energized upon the opening of the contacts OH–1, and the de-energization of the print command relay R2D disconnects voltage feed to the range lock-in relay R2 and the wiper 36 leading to the range control relays upon the opening of the normally open contacts R2D–1. The equipment is now in a quiescent state with the arranged selector switch primed for operation upon the closing of the normally closed contacts R2–1. As previously stated, the next recording cycle is initiated upon the subsequent energization of the print command relay R2D which initiates a pulsing of the up-coil in the manner above explained.

In the simplified box diagram circuit of Fig. 1 and in the accompanying circuit of Fig. 2 the contacts of the range control relays are associated with the hundreds, tens and units switches and the slave switch 45'. This is somewhat modified in the embodiment of Fig. 3 now being described. It should be noted that the range groups for the transducers have consistent limited range patterns. That is, the overall range of from zero to 3099 covered by these range groups all have 399 unit range spans, with 100 unit overlap, and fall within consecutive or consistent 399 unit ranges. There are ten such consecutive ranges in this overall range pattern of from zero through 3099. Accordingly, only ten relays are needed to control the connection between the hundred switch 45 shown in Fig. 1 and the ten channel typewriter inputs. Accordingly, referring to Fig. 5, the range control relay step switch has an additional level SRM-4' wherein the stationary contacts thereof are connected to one of the ten typewriter channel control relays R28 through R37 which operate the equipment in the limited range associated with the contact involved. The typewriter channel control relays in turn have contacts R28 through R37 arranged between the No. 0 through No. 3 contacts of the hundred switch 45 much in the same manner as described in Fig. 2. It is felt that the detailed circuit showing of this circuit is unnecessary since it is apparent how these connections are made in view of the showing in Fig. 2. The contacts of the range control relays are replaced by appropriate contacts of the typewriter channel control relays.

The circuit for providing the fourth digit is somewhat more complicated than the system shown in Fig. 1 because the fourth digit may be either 1, 2 or 3, depending upon which limited range of operation is involved. Fig. 7 shows a complete wiring diagram for the circuit which produces the fourth digit. The slave hundred switch 45' shown in the embodiment of Fig. 1 and the contacts R10–3 therein are replaced by the circuit shown in Fig. 7 which includes the line 95 and the various parallel branch circuits associated respectively with the normally open contacts R0H, R1H, R2H and R3H. A slave switch 45" ganged for operation with the hundred switch 45 shown in Fig. 1 and range correction relays R0H, R1H, R2H and R3H are connected respectively to the No. 0 through No. 3 contacts of this switch. When the wiper 96 of the slave switch 45" is on its No. 0 contact, the wiper of the hundred switch 45 is also on its zero contact, and the relay R0H is accordingly energized. It should be understood that the wipers of these switches are in this position when the potentiometer slide wire wiper is in the lower quarter of its range of operation. The No. 1 thousands digit in such case is required only in the ranges 1200 through 1599 (relay R32), 1500 through 1899 (relay R33) and the range 1800 through 2199 (relay R34). Accordingly, the contacts of relays R32, R33 and R34 are connected between the relay contacts R0H–1 and the No. 1 input channel to the typewriter 20. Similarly, in the ranges of from 2100 through 3099, R0H–1 contacts are connected to the No. 2 input channel to the typewriter through contacts R35–1, R36–1 and R37–1 of the typewriter channel control relays R35 through R37. In a similar manner, the various connections between the range correction control relay contacts R1H–1, R2H–1 and R3H–1 may be determined.

Figure 6:
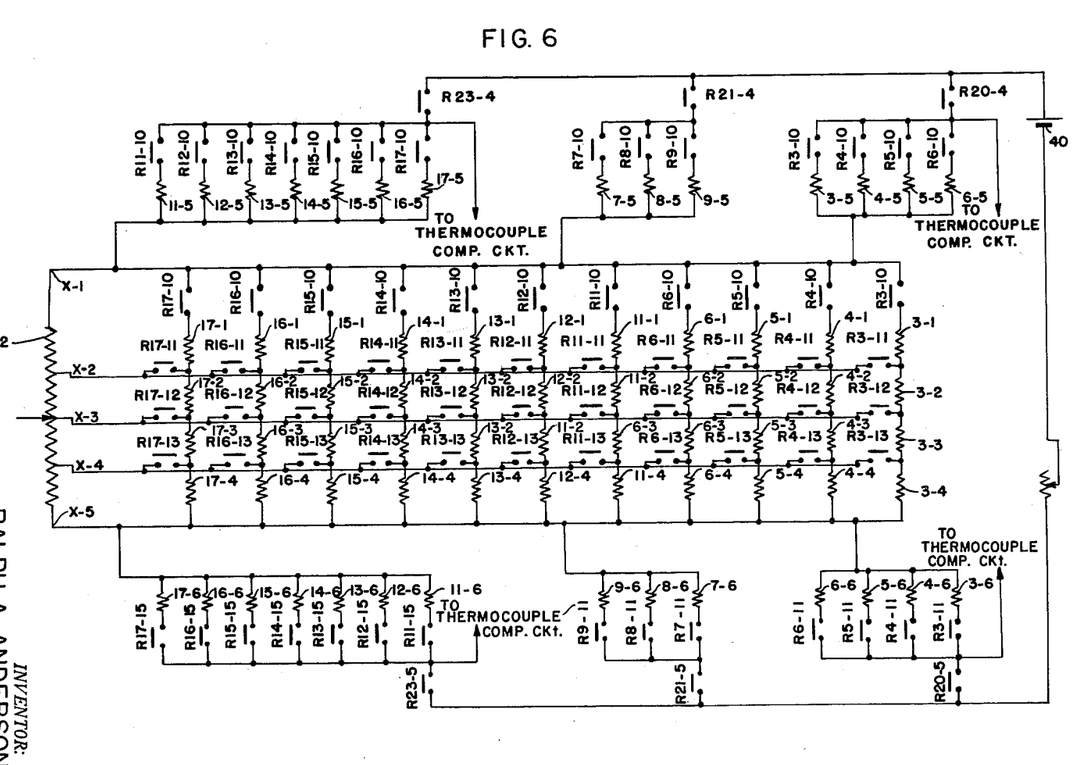
Fig. 6 is a circuit diagram of the imput circuit to the slide wire potentiometer shown in Fig. 3.

Refer now to Fig. 6 showing a detail circuit diagram of the input circuit to the potentiometer slide wire 22 for the embodiment of Fig. 3. This circuit was only broadly referred to in the description of the latter figure. From the previous description, it is apparent that each of the range control relays have contacts in the input circuit to the slide wire potentiometer for inserting the proper resistance in circuit with the potentiometer slide wire to enable the potentiometer circuit to be balanced over the various limited ranges involved for a particular transducer. Further, where the transducers are non-linear thermocouples, for each limited range of operation of the equipment for a particular type thermocouple, a different group of four resistances are connected across the slide wire points X–1, X–2, X–3, X–4 and X–5, representing 100 unit increments. Since there are eleven range control relays associated with the non-linear thermocouples in the embodiment shown in the drawings, there are eleven branch circuits or resistance networks associated with the potentiometer slide wire for non-linear correction. Each of these branches includes contacts of the range control relays, such as contacts R3–10 through R17–10 connected to the X–1 terminal of the potentiometer slide wire. These contacts each join a series of four resistors connected in series, such as resistors 3—1 through 3—4, 4—1 through 4—4 . . . and 17—1 through 17—4 which connect with the opposite terminal X–5 of the potentiometer slide wire. Extending from the juncture of each adjacent pair of resistance elements is a set of contacts of the associated range control relay leading to one of the intermediate tap-off points X–2, X–3 or X–4 of the potentiometer slide wire so that only the desired resistance branch circuit is operatively associated with the slide wire.

The value of each of the aforementioned resistance elements is such that the combined or resultant resistance of each element in parallel with the portion of the slide wire across which it is connected will, in conjunction with the other resistance elements in the other sections of the slide wire, provide a near perfect linear relationship between the position of the wiper of the slide wire at the points X-1, X-2, X-3, X-4 and X-5 and the temperature variable for the 399 unit range involved when correlated with the values of the resistances inserted in series with the potentiometer slide wire. As previously stated, the aforementioned points of the slide wire represent 100 unit increments and the non-linearity of the thermocouple outputs do not vary much over 100 degree ranges.

Each of the resistance elements connected across the various portions of the slide wire is made many times greater than the resistance of the portion of the slide wire involved to minimize errors due to variations in contact resistances and in the small variations from the theoretical or desired values of the resistance elements due to the practical limits of manufacturing tolerances.

Connected to each end of the slide wire potentiometer are three groups of resistance branch circuits associated respectively with the three different types of transducers. Opposite terminals of the standard or predetermined source of voltage 40 are connected to these three groups of resistance branch circuits through contacts of the master relays R20, R21 and R23. Extending from the latter contacts to the adjacent end terminal of the slide wire are a series of parallel branch circuits each including contacts of the associated range control relays and resistance elements, such as elements 3—5 through 17—5, and 3—6 through 17—6, having values which enable operation of the potentiometer slide wire in the limited range of values identified with the associated range control relay. In the case of the resistance branch circuits associated with thermocouple transducers, leads extending from the juncture of the master control relay contacts, such as R20-4, R20-5, R21-4, R21-5, R23-4, R23-5, and the associated resistance branch circuits connect with cold junction thermocouple compensation circuits (the details of which are not shown) conventionally used to correct for temperature variations of the junctions in circuit with the field thermocouples. Such a cold junction compensation circuit is disclosed in U.S. Patent No. 2,277,365, granted March 24, 1942 to O. S. Michael. The same compensation circuit for all ranges of operation of each type of thermocouple, and the master control relay contacts R20-4, R20-5 and R23-4, and R23-5 switch these thermocouple compensation circuits in and out of the slide wire circuit at the appropriate times.

It should be understood that numerous modifications may be made of the preferred embodiments of the invention above described without deviating from the broader aspects of the invention.

I claim:

1. In a system including a number of primary measuring devices associated with variables whose values may fall within a wide range of values, said devices producing voltage outputs whose magnitudes are a function of the values of the associated variables, digital data recording apparatus for measuring the output of said devices and recording in digital form numerical datum of the values of the variables, scanning means for sequentially feeding the voltage outputs of said devices to said data recording apparatus, said data recording apparatus comprising: potentiometer means, detecting means for sensing a voltage difference between the output of said potentiometer means and a signal voltage derived from the voltage output of the primary measuring device being scanned, balancing motor means responsive to said detecting means for adjusting the movable contact means of said potentiometer means to balance the output voltage thereof with said signal voltage, an analogue to digital converter driven by said motor means, a digital recorder controlled by said analogue to digital converter which recorder is capable of recording values within said wide range of values, the data recorder apparatus being initially adjusted so that a given range of deflection of the movable potentiometer contact means will result in a change in recorded data of a substantially smaller number of units than is encompassed by said wide range of values, means for rendering said data recorder apparatus operative over a number of limited ranges of values encompassing said wide range of values, upper and lower limit switch means operated respectively when the movable contact means on said potentiometer means reaches the limits of said given range of deflection, means responsive to the operation of said upper limit switch for (a) applying a voltage to the input of said potentiometer means which will balance signal voltages in the next higher limited range of values, and (b) for modifying the connections between said analogue to digital converter and said recorder for increasing the first digit of the lowest number which can be recorded to a value corresponding to the first digit of the lowest number of said next higher range of values, and means responsive to the operation of said lower limit switch for: (a) applying a voltage to the input to said potentiometer means which will balance signal voltages of the next lower limited range of values, and (b) for modifying the connections between said converter and recorder for decreasing the first digit of the lowest number which can be recorded to a value corresponding with the first digit of the lowest number of said next lower range of values.

2. In a system including a number of primary measuring devices associated with variables whose values may fall within a wide range of values, said devices producing voltage outputs whose magnitudes are a function of the values of the associated variables, digital data recording apparatus for measuring the output of said devices and recording in digital form numerical datum of the values of the variables, scanning means for sequentially feeding the voltage outputs of said devices to said data recording apparatus, said data recording apparatus comprising: potentiometer means, detecting means for sensing a voltage difference between the output of said potentiometer means and a signal voltage derived from the voltage output of the primary measuring device being scanned, balancing motor means responsive to said detecting means for adjusting the movable contact means of said potentiometer means to balance the output voltage thereof with said signal voltage, an analogue to digital converter driven by said motor means, a digital recorder controlled by said analogue to digital converter which recorder is capable of recording values within said wide range of values, the data recorder apparatus being initially adjusted so that a given range of deflection of the movable potentiometer contact means will result in a change in recorded data of a substantially smaller number of units than is encompassed by said wide range of values, means for rendering said data recorder apparatus operative over a number of limited ranges of values encompassing said wide range of values, upper and lower limit switch means operated respectively when the movable contact means on said potentiometer means reaches the limits of said given range of deflection, and means responsive to the operation of said upper and lower limit switch means for applying respective voltages to the input of said potentiometer means which will balance signal voltages for the next highest and lowest limited range of values respectively, and for modifying the connections between said converter and recorder so that the recorder automatically records proper numerical data for the range involved.

3. In a system including a number of non-linear thermocouples of a given type associated with temperature variables whose values may fall within a wide range of temperatures, digital data recording apparatus for measuring the output of said thermocouples and recording in digital forms numerical datum of the temperatures of the variables, scanning means for sequentially feeding the voltage outputs of said thermocouples to said data recording apparatus, said data recording apparatus comprising: potentiometer means, detecting means for sensing a voltage difference between the output of said potentiometer means and a signal voltage derived from the voltage output of the thermocouple being scanned, balancing motor means responsive to said detecting means for adjusting the movable contact means of said potentiometer means to balance the output voltage thereof with said thermocouple derived voltage, analogue to digital converter means driven by said motor means, a digital recorder controlled by said analogue to digital converter which recorder is capable of recording temperature values within said wide temperature range, the data recorder apparatus being initially adjusted so that a given range of deflection of the movable potentiometer contact means will result in a change in recorded data of a substantially smaller number of temperature units than is encompassed by said wide range of temperature values, respective compensating impedance means for compensating for the non-linearity of said thermocouples when connected across said potentiometer means within different limited ranges of temperature values which together include all temperatures within said wide range of temperature values, upper and lower limit switch means operated respectively when the movable contact means on said potentiometer means reaches the limits of said given range of deflection, means responsive to the operation of said upper limit switch for (a) applying a voltage to the input of said potentiometer means which will balance the thermocouple derived voltages for the next higher range of said limited range of temperature values, (b) for modifying the connection between said analogue to digital converter and said recorder for increasing the first digit of the lowest number which can be recorded to a value corresponding to the first digit of the lowest temperature value of said next higher range of temperature values, and (c) for inserting across said potentiometer means the compensating impedance means corresponding to said next higher temperature range, and means responsive to the operation of said lower limit switch for: (a) applying a voltage to the input to said potentiometer means which will balance the thermocouple derived voltages of the next lower range of said limited range of temperature values, (b) for modifying the connections between said converter and recorder for decreasing the first digit of the lowest number which can be recorded to a value corresponding with the first digit of the lowest temperature value in said next lower range of temperature values, and (c) for inserting across said potentiometer means the compensating impedance corresponding to said next lowest temperature range.

4. In a system including a number of non-linear thermocouples of a given type associated with temperature variables whose values may fall within a wide range of temperatures, digital recording apparatus for measuring the output of said thermocouples and recording data of the temperatures of the variables, said recording apparatus including measuring means having a movable element whose position is responsive to the magnitude of the variable being measured thereby, an analogue to digital converter responsive to said movable element and a digital recorder responsive to said converter, scanning means for sequentially feeding the voltage outputs of said thermocouples to said measuring means, respective compensating impedance means for compensating for the non-linearity of said thermocouples within different limited ranges of temperature values which together included all temperatures within said wide range of temperature values, upper and lower limit switch means operative respectively when said movable element reaches the opposite limits of a given range of deflection thereof, means responsive to the operation of said upper limit switch means for inserting into said system the compensating impedance means corresponding to the next higher temperature range for modifying the operation of said measuring means so that said movable element operates within said range of deflection for the next higher temperature range, and for modifying the connection between the output of said converter and the digital recorder to record directly numerical datum in said higher range, and means responsive to the operation of said lower limit switch means for inserting into said system the compensating impedance means corresponding to the next lower temperature range for modifying the operation of said measuring means so that said movable element operates within said range of deflections for the next lower temperature range, and for modifying the connections between the output of said digital converter and said recorder to record directly numerical datum in said lower range.

5. In combination, recording apparatus for recording the values of a large number of variables whose values may vary over a wide range of values, scanning switch means for sequentially feeding signals representing the values of the variables to said recording apparatus, said recording apparatus including a measuring device arranged to respond normally to signals representing a variation in value of a number of units substantially less than said wide range of values, a recorder responsive to said measuring device for recording the actual values of the variables, range change circuit means for automatically adjusting and controlling respectively said measuring device and recorder to operate the same within a number of limited ranges which together cover said wide range of values, said range change circuit means including a number of range change relays, at least one relay provided for each limited range, circuits including contacts of said range change relays for controlling said measuring device and recorder to operate the same in respective limited ranges, step switch means having a number of stationary terminals to which said relays are respectively connected and solenoid means for moving the movable contact of the step switch means in either of two directions, the relays being connected to successive terminals of said step switch means in order of the ranges in which they operate, said step switch means having first control circuit means for pulsing said solenoid means to advance the step switch means one position in a forward direction and second control circuit means for pulsing said solenoid means to move the movable contact of said step switch means one position backward in the opposite direction, range selector means responsive to movement of said scanning switch means for initially energizing the relay which operates the recording apparatus in the limited range which the variable scanned is normally expected to operate, said selector means operating the latter relay independently of said step switch means, lock-in relay means connected to the movable contact of said step switch means, means for blind pulsing said control circuit means to bring the movable contact of the step switch means into contact with the stationary contact associated with the selected relay, said lock-in relay means pulling in when the movable contact of said step switch means is positioned on the contact associated with the terminal connected to said selected relay, said lock-in relay having contacts which hold the lock-in relay, terminate the blind pulsing of said control circuit means, disconnect the range control relays from said range selector means, and connect a source of energizing voltage to the movable contact of said step switch means, and means responsive to said measuring device for automatically pulsing said first control circuit means to advance the movable contact of the step switch means one position in a forward direction when the signal to the measuring device indicates that the signal is in a higher limited range and for pulsing said second control circuit means for moving the movable contact of the control switch means one position backward one position when the signal fed to the measuring device indicates that the variable is in a lower limited range.

6. In combination, recording apparatus for recording the values of a large number of variables whose values may vary over a wide range of values, scanning switch means for sequentially feeding signals representing the values of the variables to said recording apparatus, said recording apparatus including a measuring device arranged to respond normally to signals representing a variation in value of a number of units substantially less than said wide range of values, a recorder responsive to said measuring device for recording the values of the variables, range change circuit means for automatically adjusting and controlling respectively said measuring device and recorder to operate the same within a number of limited ranges which together cover said wide range of values, said range change circuit means including a number of range change means, at least one such means being provided for each limited range, circuits including said range change means for controlling said measuring device and recorder to operate the same in respective limited ranges, step switch means having a number of stationary terminals to which said range change means are respectively connected and solenoid means for moving the movable contact of the step switch means in either of two directions, the range change means being connected to successive terminals of said step switch means, in order of the ranges in which they operate, said step switch means having first control circuit means for pulsing said solenoid means to advance the step switch means one position in a forward direction and second control circuit means for pulsing said solenoid means to move the movable contact of said step switch means one position backward in the opposite direction, range selector means responsive to movement of said scanning switch means for initially energizing the range change means which operates the recording apparatus in the limited range which the variable scanned is normally expected to operate, and means responsive to said measuring device for automatically pulsing said first control circuit means to advance the movable contact of the step switch means one position in a forward direction when the signal to the measuring device indicates that the signal is in a higher limited range and for pulsing said second control circuit means for moving the movable contact of the control switch means one position backward one position when the signal fed to the measuring device indicates that the variable is in a lower limited range.

7. In a system including a number of primary measuring devices associated with variables whose values may fall within a wide range of values, said devices producing voltage outputs whose magnitudes are a function of the values of the associated variables, digital data measuring and recording apparatus for measuring the output of said devices and recording in digital form numerical data of the values of the variables, and scanning means for sequentially feeding the voltage outputs of said devices to said data recording apparatus, the improvement in said data recording apparatus comprising: potentiometer means, detecting means for sensing a voltage difference between the output of said potentiometer means and a signal voltage derived from the voltage output of the primary measuring device being scanned, balancing motor means responsive to said detecting means for adjusting the movable contact means of said potentiometer means to balance the output voltage thereof with said signal voltage, an analogue to digital converter driven by said motor means, said analogue to digital converter means having X number of outputs representing an X digit number, a digital recorder having a number of input channels for receiving signals to produce the desired numerical data, means for adjusting the data recording apparatus so that a given range of deflection of the movable contact means of the potentiometer means will result in a change in recorded data of a substantially smaller number of units than is encompassed by said wide range of values, means for rendering said data recording apparatus operative over a number of limited ranges of values encompassing said wide range of values, upper and lower limit switch means operated respectively when the movable contact means on said potentiometer means reaches the limits of said given range of deflections thereof, means responsive to the operation of said upper limit switch for applying a voltage to the input of said potentiometer means which will balance signal voltages in the next higher limited range of values and for modifying the connections between said analogue to digital converter and the input to said recorder to print the actual numerical values of the variables being monitored, means responsive to the operation of said lower limit switch for applying a voltage to the input to said potentiometer means which will balance signal voltages of a next lower limited range of values, means responsive to the operation of said upper and lower limit switches and to the output of said analogue to digital converter identified with the highest digit indicated thereby for energizing the proper input channel to the recorder for producing the required X plus 1 digits for a variable having such number of digits.

8. In combination, first analogue measuring means for measuring the value of a variable, an analogue to digital converter responsive to said analogue measuring means, said analogue to digital converter means having X number of outputs representing an X digit number, a digital recorder having a number of input channels for receiving signals to produce the desired numerical data, said analogue measuring means being of a type normally operative for a change in variable of a number of units having X digits, control means for selectively rendering said analogue measuring means operative over a number of limited ranges encompassing said wide range of values including respective upper and lower limit responsive means operated respectively when the analogue measuring means is being operated in the vicinity of the upper and lower limits of any one of said limited ranges, means responsive to the operation of said upper limit responsive means for operating said control means to adjust the analogue measuring means for operating the next higher limited range and for modifying the connections between said analogue to digital converter and the input to said recorder to print the actual numerical values of the variables being monitored, means responsive to the operation of said lower limit responsive means for operating said control means to adjust the analogue measuring means for operation in the next lower limited range, means responsive to the operation of said upper and lower limit responsive means and to the output of said analogue to digital converter associated with the highest digit indicated thereby for energizing the proper input channel to the recorder for producing the required X plus 1 digit for a variable having such number of digits.

9. In combination, first analogue measuring means for measuring the value of a variable, an analogue to digital converter responsive to said analogue measuring means and having a number of outputs corresponding to the number of digits in the normal range of operation of said analogue measuring means, a digital recorder having a number of input channels for receiving signals to produce the desired data, means for selectively rendering said analogue measuring means operative over a number of limited ranges encompassing an overall wide range of values including respective upper and lower limit responsive means operated respectively when the analogue measuring means is being operated in the vicinity of the upper and lower limits of any one of said limited ranges, step switch means operated in one direction by said upper limit responsive means and operated in the opposite direction responsive to said lower limit responsive means, respective range change relays connected to terminals of said step switch means and arranged to be energized when the movable contact of said step switch means contacts the associated terminal, said range change relays connected to successive terminals of said step switch means in the order of the limited ranges with which they are associated, circuits controlled by said range change relays which respectively operate the analogue measuring means in said limited ranges, said range change relays having contacts controlling the connection between said analogue to digital converter in said input channels to said digital recorder to obtain the proper numerical data corresponding to the operating range of the equipment, and means responsive to the operation of said upper limit responsive means and to the energization of the range change relays associated with the uppermost of said limited ranges for preventing the recording of numerical data when the signal measured by said measuring means falls outside of the uppermost of said limited ranges.

10. Apparatus for indicating the values of variables over a given wide range of values comprising: first and second groups of primary measuring devices having different respective scale factors, a single secondary measuring device having a normal range of measurement appreciably less than the wide range of values to be measured by said primary measuring devices, scanning means for sequentially connecting said secondary measuring device to said primary measuring devices, respective groups of range control means associated with said groups of primary measuring devices, the range control means within each group when energized respectively operating said measuring means within adjacent limited ranges covering an overall relatively wide range of values, range selector means operated with said scanning means for energizing a range control means associated with the group of range control means identified with the primary measuring device being scanned, upper limit responsive means for transferring operation from an energized range control means to the range control means of the same group associated with the next higher limited range of the group when the output of the scanned primary measuring device has operated said measuring means in the vicinity of the upper limit of its then limited operating range, and lower limit responsive means for transferring operation from an energized range control means to the range control means associated with the next lower limited range within the associated group when the output of the scanned primary measuring device has operated said secondary measuring device in the vicinity of the lower limit of its then limited operating range.

11. In combination, measuring and recording apparatus for measuring and recording the values of a large number of variables whose values may vary over a wide range of values, scanning switch means for sequentially feeding signals representing the values of the variables to said measuring and recording apparatus, said measuring and recording apparatus including a measuring device arranged to respond normally to signals representing a variation in value of a number of units substantially less than said wide range of values, a recorder responsive to said measuring device for recording the values of the variables, range change circuit means for automatically adjusting and controlling respectively said measuring device and recorder to operate the same within a number of groups of limited ranges which together cover said wide range of values, said range change circuit means including a number of groups of range change relays for said respective groups of limited ranges, the limited ranges within each group covering an overall range substantially greater than that covered by each limited range, circuits including contacts of said range change relays for controlling said measuring device and recorder to operate the same in a selected limited range, step switch means having a number of stationary terminals to which said groups of relays are successively connected and respective up and down solenoid means for moving the movable contact of the step switch means in two directions, the range change relays associated with each range group being connected to successive terminals of said step switch means in order of the ranges in which they operate, said step switch means having first control circuit means for pulsing said up solenoid means to advance the movable contact of said step switch means one position in a forward direction and second control circuit means for pulsing said down solenoid means to move the movable contact of said step switch means one position backward in the opposite direction, range selector means responsive to the position of said scanning switch for effecting the movement of the movable contact of said step switch means to the stationary terminal associated with the range change relay identified with the limited range within the group of ranges identified with and in which the variable scanned is normally expected to operate, said first control circuit means including a second step switch means with terminals corresponding to the said terminals of said first mentioned step switch means, said up solenoid means being connected to the movable contact of said second step switch means, means associated with the respective terminals of said second step switch means which are identified with all but the highest limited range within each of said group of ranges for coupling a source of energizing voltage thereto to pulse the up solenoid when the associated range change relays are energized and said measuring device has been operated to the vicinity of the upper extreme of the then operating range of the measuring device, the stationary terminals of said second mentioned step switch means associated with the upper limited range of said group of ranges being left unconnected to said voltage source, whereby the movable contact of said second step switch means is prevented from moving to the next higher terminal thereof, said second control circuit means including a third step switch means having stationary terminals corersponding to those of said other mentioned step switch means, said down solenoid being connected to the movable contact of said second step switch means, and means associated with the stationary terminals of said third step switch means identified with all but the lowest of the limited ranges of the associated group for coupling energizing voltage to the movable contact of said third step switch means to pulse the down coil when the measuring device is operated in the vicinity of the lower extreme of the then operating range of the measuring device, the stationary terminals of said third step switch means associated with the lower limited ranges of the range group being unconnected to an energizing source to prevent the movement of the movable contact member to a contact terminal associated with another range group.

12. In combination, recording apapratus for recording the values of a number of variables whose values may vary over a wide range of values, scanning switch means for sequentially feeding signals representing the values of the variables to said recording apparatus, said recording apapratus including a measuring device arranged to respond normally to signals representing a variation in value of a number of units substantially less than said wide range of values, a recorder responsive to said measuring device for recording the values of the variables, range change circuit means for automatically adjusting and controlling respectively said measuring device and recorder to operate the same within a number of limited ranges which together cover said wide range of values, said range change circuit means including range change means, at least one such range change means being provided for each limited range, each of said range change means controlling said measuring device and recorder to operate the same in the associated limited range, range selector means responsive to movement of said scanning switch means for initially energizing the range change means which range change means operates the recording apparatus in the limited range which the variable scanned is normally expected to operate, and means responsive to said measuring device for automatically energizing the range change means for the next higher limited range when the signal to the measuring device indicates that the signal is in a higher limited range and for energizing the range change means for the next lower range when the signal fed to the measuring device indicates that the variable is in a lower limited range.

13. In combination, recording apparatus for recording the values of a number of types of variables each of whose values may vary over a wide range of values, scanning switch means for sequentially feeding signals representing the values of the variables to said recording apparatus, said recording apparatus including a measuring device arranged to respond normally to signals representing a variation in value of a number of units substantially less than said wide range of values, a recorder responsive to said measuring device for recording the values of the variables, range change circuit means for automatically adjusting and controlling respectively said measuring device and recorder to operate the same within a number of limited ranges which together cover said wide range of values of all of said variable types, said range change circuit means including a different group of range change means for each variable type, at least one such range change means in each group being provided for each limited range of values for the variable type involved, each of said range change means controlling said measuring device and recorder to operate the same in the associated limited range, range selector means responsive to movement of said scanning switch means for initially energizing the range change means of the group for the variable type involved which range change means operates the recording apparatus in the limited range which the variable scanned is normally expected to operate, and means responsive to said measuring device for automatically energizing the range change means for the next higher limited range of the group involved when the signal to the measuring device indicates that the signal is in a higher limited range and for energizing the range change means for the next lower range of the group involved when the signal fed to the measuring device indicates that the variable is in a lower limited range.

14. In a system including a number of non-linear thermocouples associated with temperature variables whose values may fall within a wide range of temperatures, data recording apparatus for measuring the output of said thermocouples and recording data of the temperatures of the variables, scanning means for sequentially feeding the voltage outputs of said thermocouples to said data recording apparatus, said data recording apparatus comprising: potentiometer means, detecting means for sensing a voltage difference between the output of said potentiometer means and a signal voltage derived from the voltage output of the thermocouple being scanned, balancing motor means responsive to said detecting means for adjusting the movable contact means of said potentiometer means to balance the output voltage thereof with said thermocouple derived voltage, a recorder responsive to said balancing motor means for indicating the values of the temperature variables, the data recorder apparatus being initially adjusted so that a given range of deflection of the movable potentiometer contact means will result in a change in recorded data of a substantially smaller number of temperature units than is encompassed by said wide range of temperature values, a group of compensating impedance means for compensating for the non-linearity of said thermocouples when connected across said potentiometer means within different limited ranges of temperature values which together include all expected temperatures to be measured, upper and lower limit switch means operated respectively when the movable contact means on said potentiometer means reaches the limits of said given range of deflection, means responsive to the operation of said upper limit switch for (a) applying a voltage to the input of said potentiometer means which will balance the thermocouple derived voltages for the next higher range of said limited range of temperature values, (b) for modifying the data recorded by said recorder, and (c) for inserting across said potentiometer means the compensating impedance means corresponding to said next higher temperature range, and means responsive to the operation of said lower limit switch for (a) applying a voltage to the input of said potentiometer means which will balance the thermocouple derived voltages of the next lower range of said limited range of temperature values, (b) for modifying the data recorded by said recorder, and (c) for inserting across said potentiometer means the compensating impedance corresponding to said next lowest temperature range.

15. In a system including a number of non-linear thermocouples of a number of different types and associated with temperature variables whose values may fall within a wide range of temperatures, data recording apparatus for measuring the outputs of said thermocouples and recording data of the temperatures of the variables, scanning means for sequentially feeding the voltage outputs of said thermocouples to said data recording apparatus, said data recording apparatus comprising: potentiometer means, detecting means for sensing a voltage difference between the output of said potentiometer means and a signal voltage derived from the voltage output of the thermocouple being scanned, balancing motor means responsive to said detecting means for adjusting the movable contact means of said potentiometer means to balance the output voltage thereof with said thermocouple derived voltage, a recorder responsive to said balancing motor means for indicating the values of the temperature variables, the data recorder apparatus being initially adjusted so that a given range of deflection of the movable potentiometer contact means will result in a change in recorded data of a substantially smaller number of temperature units than is encompassed by said wide range of temperature values, a different group of compensating impedance means for each thermocouple type for compensating for the non-linearity of said thermocouples when connected across said potentiometer means within different limited ranges of temperature values which together include all expected temperatures to be measured by the thermocouple type involved, upper and lower limit switch means operated respectively when the movable contact means on said potentiometer means reaches the limits of said given range of deflection, means responsive to said scanning means for rendering active the group of compensating impedance means corresponding to the thermocouple type involved, means responsive to the operation of said upper limit switch for (a) applying a voltage to the input of said potentiometer means which will balance the thermocouple derived voltages for the next higher range of said limited range of temperature values, (b) for modifying the data recorded by said recorder, and (c) for inserting across said potentiometer means the compensating impedance means of the selected group corresponding to said next higher temperature range, and means responsive to the operation of said lower limit switch for (a) applying a voltage to the input to said potentiometer means which will balance the themocouple derived voltages of the next lower range of said limited range of temperature values, (b) for modifying the data recorded by said recorder, and (c) for inserting across said potentiometer means the compensating impedance of the selected group corresponding to said next lowest temperature range.

16. In combination, recording apparatus for recording the values of a number of types of variables each of whose values may vary over a wide range of values, scanning switch means for sequentially feeding signals representing the values of the variables to said recording apparatus, said recording apparatus including a measuring device arranged to respond normally to signals representing a variation in value of a number of units substantially less than said wide range of values, a recorder responsive to said measuring device for recording the values of the variables, range change circuit means for automatically adjusting and controlling respectively said measuring device and recorder to operate the same within a number of limited ranges which together cover said wide range of values of all of said variable types, said range change circuit means including a different group of range change means for each variable type, at least one such range change means in each group being provided for each limited range of values for the variable type involved, each of said range change means controlling said measuring device and recorder to operate the same in the associated limited range, range selector means responsive to movement of said scanning switch means for energizing one of the range change means of the group for the variable type involved, and means responsive to said measuring device for automatically energizing the range change means for the next higher limited range of the group involved when the signal to that measuring device indicates that the signal is in a higher limited range and for energizing the range change means for the next lower range of the group involved when the signal fed to the measuring device indicates that the variable is in a lower limited range, said range change circuit means including circuit connections which prevent energization of the range change means associated with variable types other than that scanned.

References Cited in the file of this patent
UNITED STATES PATENTS

| | | |
|---|---|---|
| 2,207,743 | Larson | July 16, 1940 |
| 2,277,365 | Michael | Mar. 24, 1942 |
| 2,366,913 | Le Clair | Jan. 9, 1945 |
| 2,661,260 | Salzman | Dec. 1, 1950 |
| 2,606,092 | Rich | Aug. 5, 1952 |
| 2,620,981 | Benson | Dec. 9, 1952 |
| 2,637,619 | Stein | May 5, 1953 |
| 2,657,376 | McAdam | Oct. 27, 1953 |
| 2,771,596 | Bellany | Nov. 20, 1956 |